United States Patent
Jung

(10) Patent No.: US 9,250,787 B2
(45) Date of Patent: Feb. 2, 2016

(54) PLAYBACK CONTROL METHOD FOR MULTIMEDIA DEVICE USING MULTI-TOUCH-ENABLED TOUCHSCREEN

(75) Inventor: Kwang Soo Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1120 days.

(21) Appl. No.: 12/326,754

(22) Filed: Dec. 2, 2008

(65) Prior Publication Data

US 2009/0144623 A1 Jun. 4, 2009

(30) Foreign Application Priority Data

Dec. 3, 2007 (KR) .................. 10-2007-0124186

(51) Int. Cl.
*G06F 3/0488* (2013.01)
*G06F 3/0484* (2013.01)

(52) U.S. Cl.
CPC .... *G06F 3/0488* (2013.01); *G06F 2203/04808* (2013.01)

(58) Field of Classification Search
CPC ................ G06F 3/0487; G06F 3/0488; G06F 2203/04808; G06F 3/017
See application file for complete search history.

(56) References Cited

U.S. PATENT DOCUMENTS

| | | | |
|---|---|---|---|
| 6,328,846 B1 | 12/2001 | Langen et al. | |
| 7,956,849 B2 * | 6/2011 | Anzures et al. | 345/173 |
| 2002/0036618 A1 * | 3/2002 | Wakai et al. | 345/157 |
| 2005/0146534 A1 | 7/2005 | Fong et al. | |
| 2006/0161871 A1 * | 7/2006 | Hotelling et al. | 715/863 |
| 2006/0288313 A1 * | 12/2006 | Hillis | 715/863 |
| 2007/0016314 A1 * | 1/2007 | Chan et al. | 700/94 |
| 2007/0177803 A1 * | 8/2007 | Elias et al. | 382/188 |
| 2008/0168353 A1 * | 7/2008 | Anzures et al. | 715/716 |
| 2009/0313544 A1 * | 12/2009 | Wood et al. | 715/716 |

FOREIGN PATENT DOCUMENTS

| | | |
|---|---|---|
| AU | 2007-100826 | 9/2007 |
| KR | 10-2005-0072071 | 7/2005 |
| KR | 10-2005-0080360 | 8/2005 |
| WO | 2007/079425 | 7/2007 |

OTHER PUBLICATIONS

"Quick Reference Guide for Touch Stream ST/LP" published in 2003 by FingerWorks, Inc.*
Decision of Patent issued on Jun. 27, 2014, in Korean Patent Application No. 10-2007-0124186.

* cited by examiner

*Primary Examiner* — Boris Pesin
*Assistant Examiner* — Paul Thatcher
(74) *Attorney, Agent, or Firm* — H.C. Park & Associates, PLC

(57) ABSTRACT

A playback control method of a multimedia device is provided for setting playback position and repetitive playback section of a multimedia file playing on the multimedia device intuitively with multi-touch behaviors on a touchscreen. The method includes sensing a multi-touch event on the touchscreen, extracting two contact points of the multi-touch event, determining coordinates of the contact points, calculating a distance between the coordinates, monitoring a variation of the distance, moving a playback position of a current playing multimedia file according to the variation of the distance, and restarting playback of the current playing multimedia file from the playback position when the contact points are released from the touchscreen.

13 Claims, 7 Drawing Sheets

PLAYBACK CONTROL METHOD FOR MULTIMEDIA DEVICE USING MULTI-TOUCH-ENABLED TOUCHSCREEN

CROSS REFERENCE TO RELATED APPLICATION

This application claims priority from and the benefit of Korean Patent Application No. 10-2007-0124186, filed on Dec. 3, 2007, which is hereby incorporated by reference for all purposes as if fully set forth herein.

BACKGROUND OF THE INVENTION

1. Field of the Invention

The present invention relates to a multimedia playback device and, in particular, to a playback control method of intuitively setting a playback position and a repetitive playback section of a multimedia file playing on a multimedia device with multi-touch behavior on a touchscreen.

2. Discussion of the Background

Touchscreens are becoming more and more popular as user interfaces for multimedia playback devices. More recently, the advent of a multi-touch touchscreen has improved the utilization of touchscreen as an input device. The multi-touch touchscreen enables a system to distinguishably recognize various types of touch events, e.g. multiple touch events, on the touch screen. With the advent of the multi-touch touchscreen, many multi-touch interaction techniques have been proposed to sense various distinct touch events.

A multi-touch touchscreen may enable a user to interact with a system more efficiently and intuitively than a single-touch touchscreen. For example, the single-touch touchscreen may have a zoom-in/zoom-out bar such that a user drags the zoom-in/zoom-out bar to zoom in or zoom out on an image, whereas the multi-touch touchscreen may allow the user to zoom in or zoom out on an image intuitively by moving two touch objects (i.e. fingers, styluses, etc.) apart or together on the screen.

Conventional touchscreen-enabled multimedia devices may be configured such that the multimedia playback application is controlled with traditional single tapping and drag and drop events while other applications are controlled with diversified touch events featured by a multi-touch touchscreen, which may result in a lack of manipulation consistency in terms of user interface. Furthermore, since the multi-touch touchscreen may operate without supplemental control objects, the user should bear all applicable touch behaviors in mind.

SUMMARY OF THE INVENTION

The present invention provides a multimedia playback control method for a multimedia device having a multi-touch touchscreen that may be capable of setting a playback position of multimedia file playing on a multimedia device with intuitive multi-touch behavior.

The present invention also provides a multimedia playback control method for a multimedia device having a multi-touch touchscreen that may be capable of setting a repetitive playback section of a multimedia file playing on a multimedia device with intuitive multi-touch behavior.

Additional features of the invention will be set forth in the description which follows, and in part will be apparent from the description, or may be learned by practice of the invention.

The present invention discloses a playback control method for a multimedia device having a touchscreen including sensing a multi-touch event on the touchscreen, extracting two contact points of the multi-touch event, determining coordinates of the two contact points, calculating a distance between the coordinates, monitoring a variation of the distance, moving a playback position of a current playing multimedia file according to the variation of the distance, and restarting playback of the current playing multimedia file from the playback position when the contact points are released from the touchscreen.

The present invention also discloses a playback control method for a multimedia device having a touchscreen including sensing a multi-touch event on the touchscreen, extracting two contact points of the multi-touch event, determining coordinates of the two contact points, calculating a distance between the coordinates, monitoring a variation of the distance, setting a repetitive playback section of a current playing file according to the variation of the distance, and playing the repetitive playback section repeatedly when the contact points are released from the touchscreen.

It is to be understood that both the foregoing general description and the following detailed description are exemplary and explanatory and are intended to provide further explanation of the invention as claimed

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF ILLUSTRATED EMBODIMENTS

Figure 1:
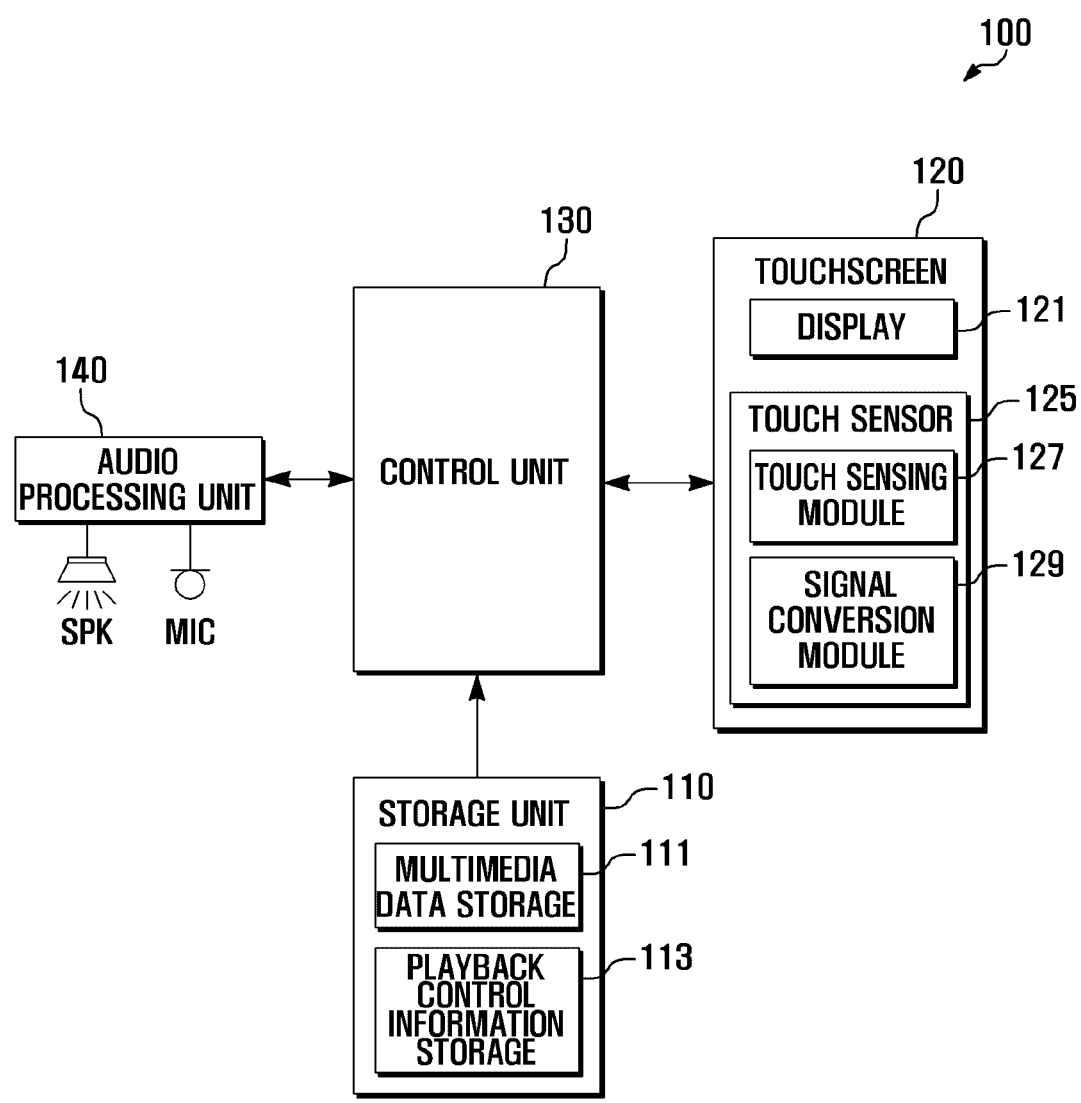
FIG. 1 is a block diagram showing a configuration of a multimedia device according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

The present invention defines touch events sensed on a multi-touch touchscreen as control commands to control multimedia playback in a multimedia device. The multimedia device may be any of electric devices supporting playback of multimedia files (including audio and video files), such as Personal Digital Assistant (PDA), palmtop computer, laptop computer, MP3 player, and Portable Multimedia Player (PMP).

FIG. 1 is a block diagram showing a configuration of a multimedia device according to an exemplary embodiment of the present invention. Referring to FIG. 1, the multimedia device 100 includes a storage unit 110, a touchscreen 120, a control unit 130, and an audio processing unit 140.

The storage unit 110 includes a program memory and a data memory. The program memory stores an operating system and application programs to provide the touchscreen 120 with a user interface. The data memory stores application data generated during the execution of the application programs. The data memory includes a multimedia data storage 111 to store a plurality of multimedia files including audio files and video files and a playback control information storage 113 to store setting information such as volume information, sound mode information, playback position, and repetitive playback section. The multimedia files may be downloaded from websites or other devices.

The touchscreen 120 includes a display 121 and a touch sensor 125. The display 121 displays the operation status of the multimedia device 100. The display 121 may include a liquid crystal display (LCD) panel, an LCD controller, and a video memory, and may display various operation status information of the multimedia device 100 in the form of texts, images, animations, and/or icons. The control unit 130 controls the display 121 to display the multimedia objects on the touchscreen 120.

The touch sensor 125 is installed on the display 121 and may include a touch sensing module 127 and a signal conversion module 129. The touch sensing module 127 senses a contact on the touch screen 120 and analyzes variations of physical quantities (e.g. resistance and capacitance) to recognize the corresponding touch event. The touch sensing module 127 sends the information about the physical quantities to the signal conversion module 129. Here, the touch event is an intended user input carried out on the touchscreen 120. The signal conversion module 129 converts the variations in the physical quantities into a digital signal. Whether the touch event is a tapping event or a drag event may be determined on the basis of the variations of the physical quantities. The touch sensing module 127 also sends coordinate information detected with the touch event to the signal conversion module 129.

The control unit 130 controls general operations of the multimedia device. Particularly in this exemplary embodiment, the control unit 130 analyzes the coordinate information output by the signal conversion module 129 and extracts at least one coordinate from the coordinate information. If multiple coordinates are extracted, the control unit 130 regards two coordinates that are closest to the edges of the touchscreen 120 as the most exterior coordinates. Next, the control unit 130 determines whether the most exterior coordinates change to increase or decrease the distance therebetween. The control unit 130 increases or decreases the playback time of ongoing playback multimedia file in proportion to the change of the distance therebetween. If the contact points on the touchscreen are released or the most exterior coordinates are not changed, the control unit 130 replays the ongoing playback multimedia file at a new playback position. If the most exterior coordinates are changed while replaying a repetitive playback section, the control unit 130 increases or decreases the repetitive playback section in proportion to the variation of the distance therebetween and replays the reset repetitive playback section right after the contact points on the touchscreen are released.

The audio processing unit 140, which includes a microphone MIC and a speaker SPK, processes the audio signals received from the control unit 130 and outputs the processed audio signals through the speaker SPK in the form of audible sound wave.

Figure 2:
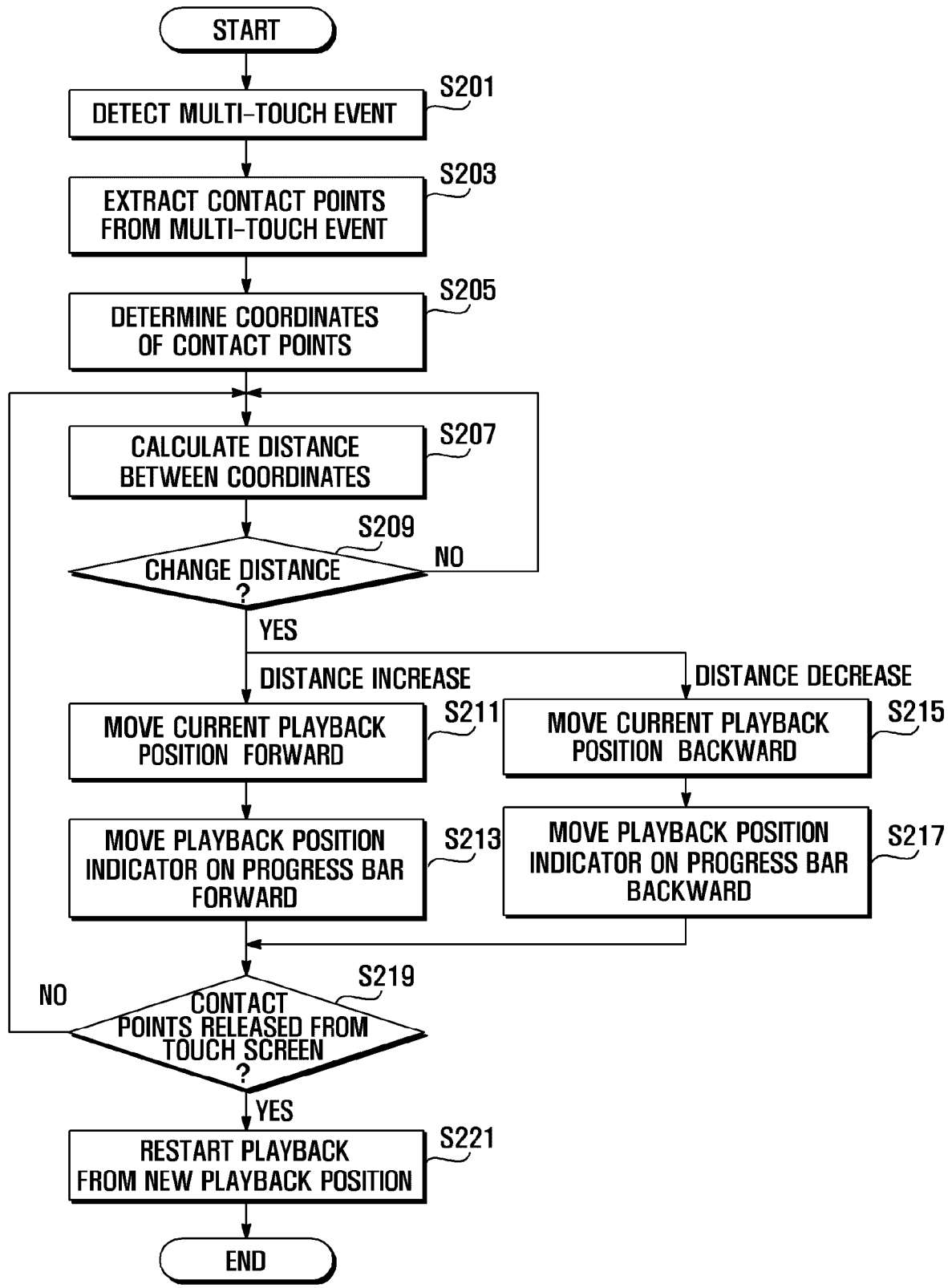
FIG. 2 is a flowchart showing a playback position setting procedure of a playback control method for a multimedia device according to an exemplary embodiment of the present invention.
Figure 3:
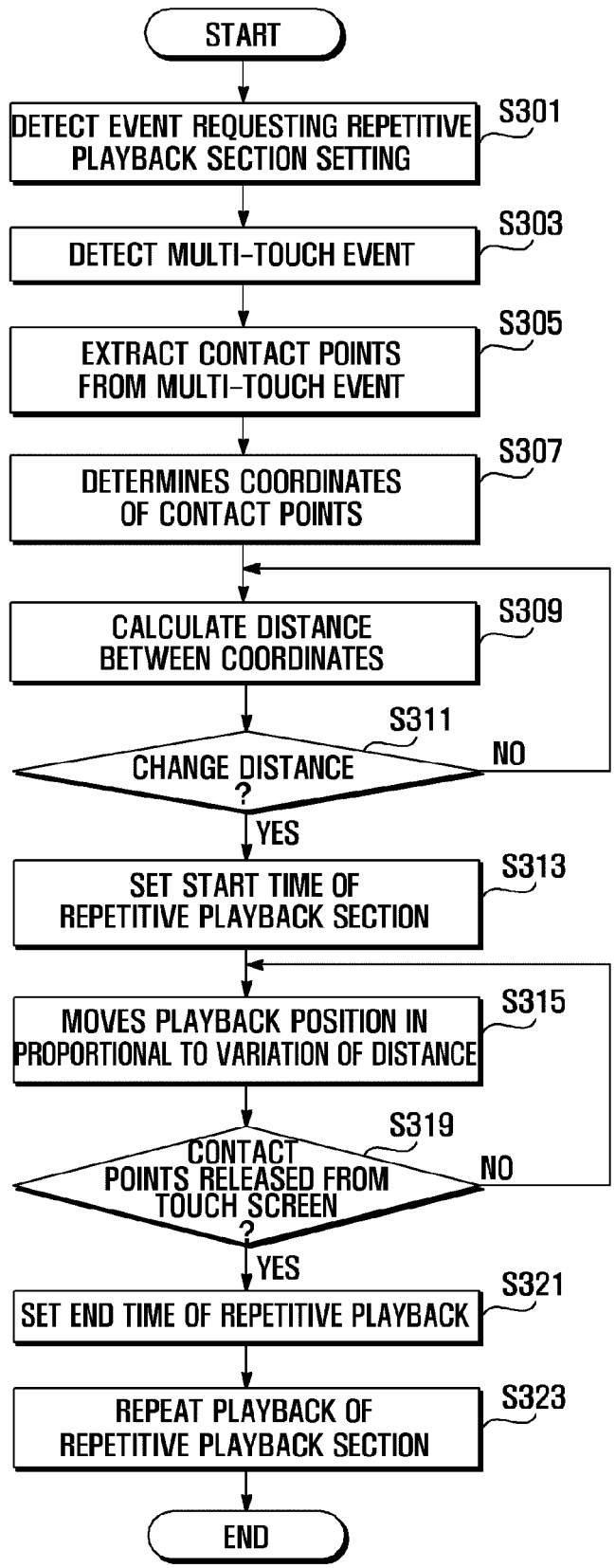
FIG. 3 is a flowchart showing a repetitive playback section setting procedure of a playback control method according to an exemplary embodiment of the present invention.
Figure 4:
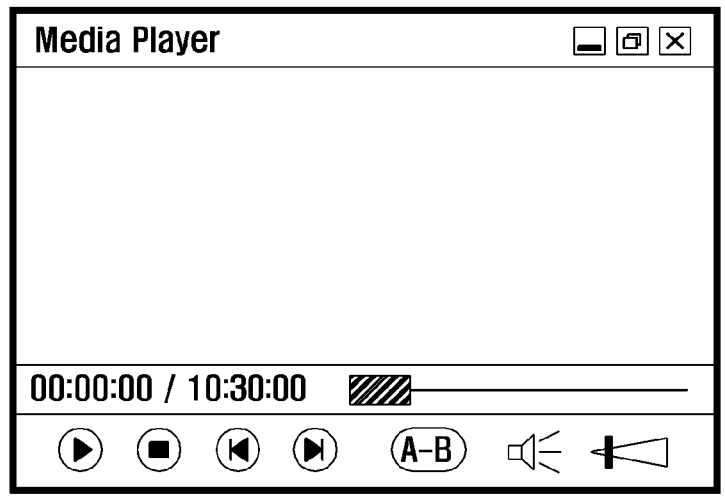
FIG. 4 is a screen image showing an initial user interface of a multimedia device according to an exemplary embodiment of the present invention.

FIG. 2 is a flowchart showing a playback position setting procedure of a playback control method for a multimedia device according to an exemplary embodiment of the present invention, FIG. 3 is a flowchart showing a repetitive playback section setting procedure of a playback control method according to an exemplary embodiment of the present invention, and FIG. 4 is a screen image showing an initial user interface of a multimedia device according to an exemplary embodiment of the present invention.

Referring to FIG. 1 and FIG. 2, the touch screen 120 of the multimedia device detects a touch event and transmits a signal corresponding to the touch event to the control unit 130 such that the control unit 130 analyzes the signal and recognizes that the touch event is a multi-touch event according to the analysis result (S201). If the touch event is determined to be a multi-touch event, the control unit 130 extracts contact points from the multi-touch event (S203), determines coordinates of two contact points of the multi-touch event (S205), and calculates a distance between coordinates of the the two contact points (S207). In this exemplary embodiment, it is assumed that a multi-touch event has two contact areas on the touchscreen 120, and the contact points are the two most exterior coordinates in the two contact areas, respectively.

Figure 5A:
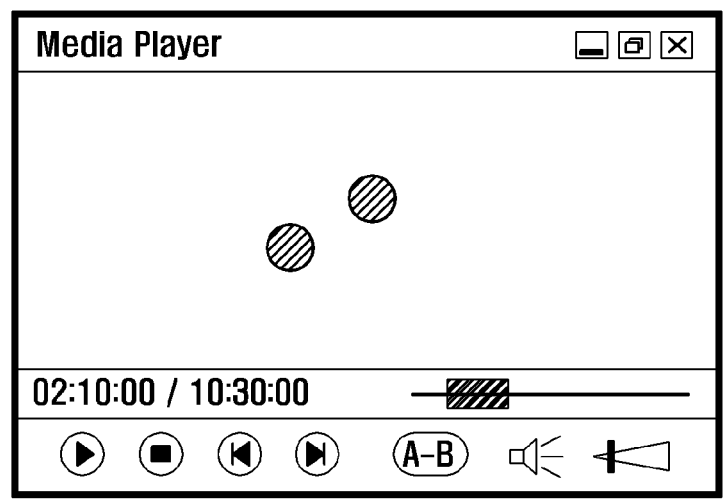
FIG. 5A and FIG. 5B are screen images showing steps of moving a playback position forward in the playback control method of FIG. 2.

Next, the control unit 130 monitors movements of the contact points and determines the distance between the two coordinates (S209). If the distance does not change, the control unit 130 repeats step S207. If the distance does change, the control unit 130 determines whether the distance increases or decreases. If the distance increases, the control unit 130 moves the current playback position forward in association with the progress of playback (S211). If the distance decreases, the control unit 130 moves the current playback position backward in association with the progress of playback (S215). For example, FIG. 5A and FIG. 5B show the case where the initial distance between the two contact points increases, and FIG. 6A and FIG. 6B show the case where the initial distance between the two contact points decreases.

Figure 5B:
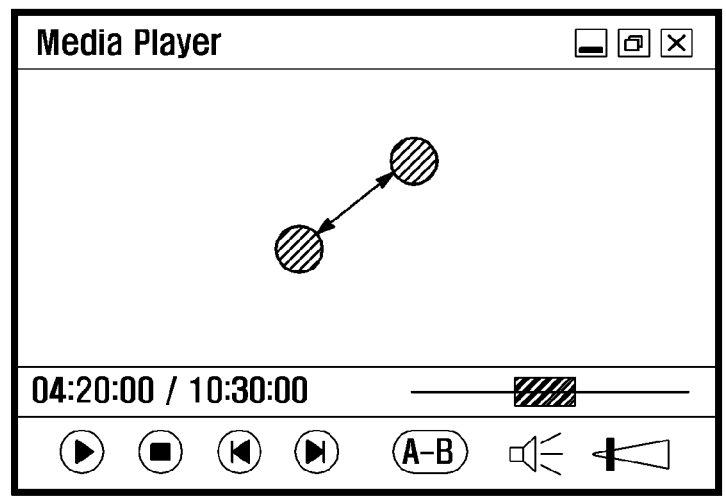
Figure 6A:
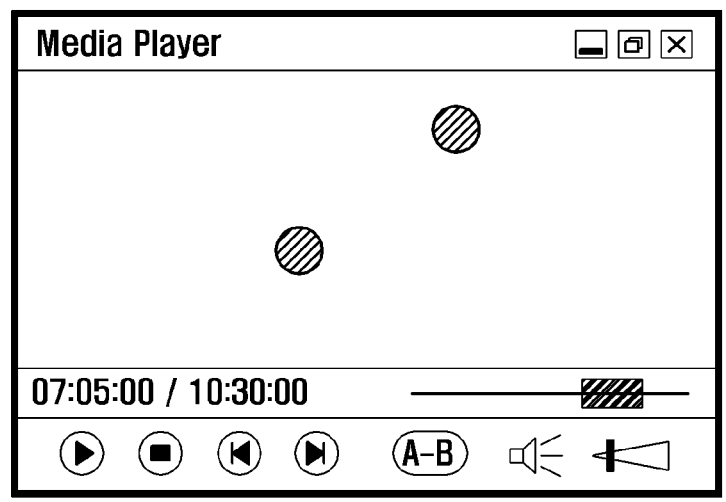
FIG. 6A and FIG. 6B are screen images showing steps of moving a playback position backward in the playback control method of FIG. 2.
Figure 6B:
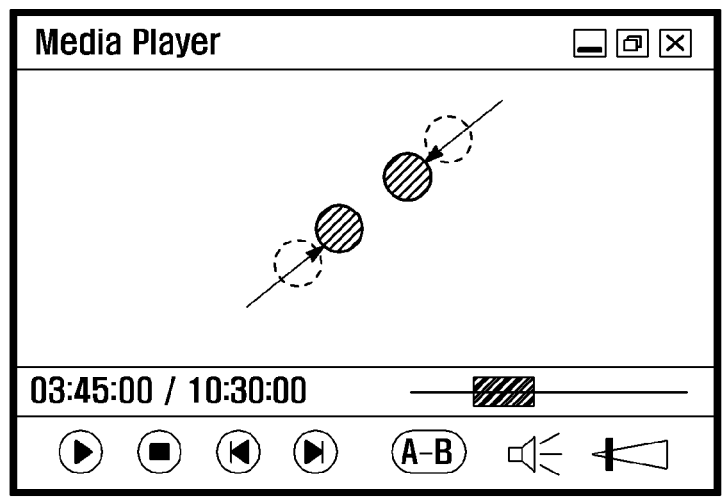

If it is determined that the distance has increased at step S209, the control unit 130 moves the current playback position forward in proportion to the displacement of the distance between two coordinates (S211) and moves the playback position indicator on the progress bar forward, as shown in FIG. 5B (S213). If it is determined that the distance has decreased at step S209, the control unit 130 moves the current playback position backward in proportion to the displacement of the distance between two coordinates (S215) and moves the playback position indicator on the progress bar backward, as shown in FIG. 6B (S217). Next, the control unit 130 determines whether the contact points on the touchscreen 120 are released (S219). If the contact points on the touchscreen 120 are released, the control unit 130 restarts playback of the multimedia file from the reset playback position (S221).

The repetitive playback section setting procure of a playback control method according to exemplary embodiments of the present invention is described hereinafter with reference to accompanying drawings.

Figure 7A:
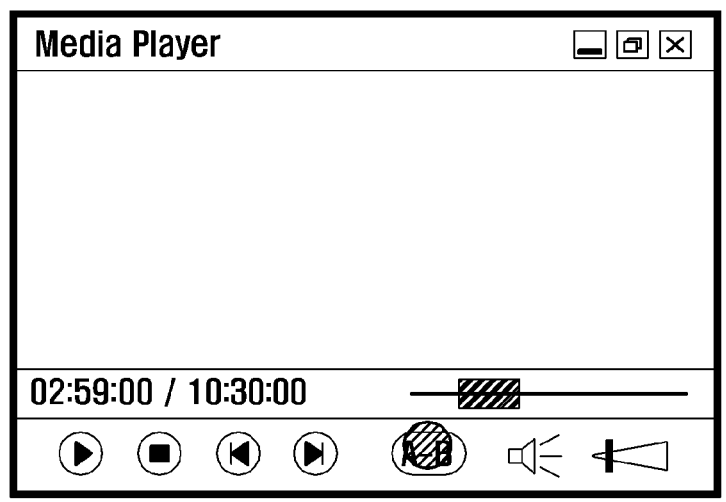
FIG. 7A, FIG. 7B, and FIG. 7C are screen images showing steps of setting a repetitive playback section in the playback control method of FIG. 3.

Referring to FIG. 1 and FIG. 3, the control unit 130 detects a repetitive playback section setting event while the multimedia device 100 replays a multimedia file and activates a repetitive playback section setting mode (see FIG. 7A) (S301). While the repetitive playback section setting mode is activated, the control unit 130 detects a touch event on the touchscreen 120 and sends a signal corresponding to the touch event to the control unit 130 such that the control unit 130 analyzes the signal and determines whether the touch event is a multi-touch event or a single-touch event (S303).

If the touch event is a multi-touch event, the control unit 130 extracts contact points from the multi-touch event (S305) and calculates coordinates of the two contact points (S307). In this exemplary embodiment, the coordinates are the most exterior coordinates closest to the edges of the touchscreen 120. Next, the control unit 130 calculates a distance between the two coordinates (S309) and determines whether the current distance changes (S311). When the distance does not change, the control unit 130 repeats step S309. When the distance does change, the control unit 130 sets the playback position at the time the distance changes as a start time point of a repetitive playback section (S313).

Figure 7B:
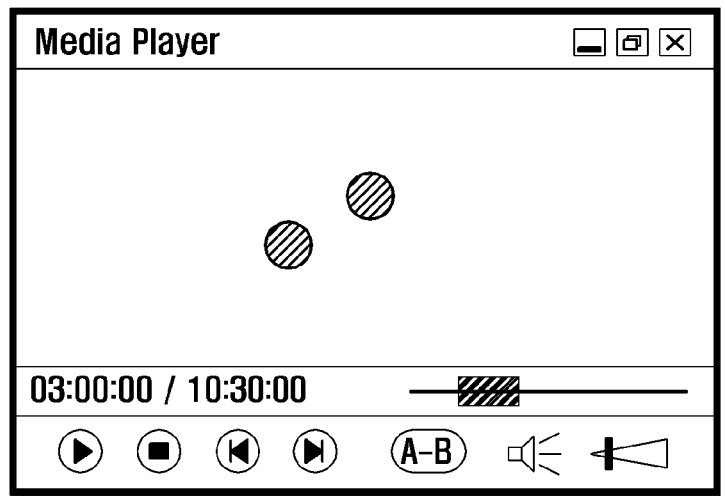
Figure 7C:
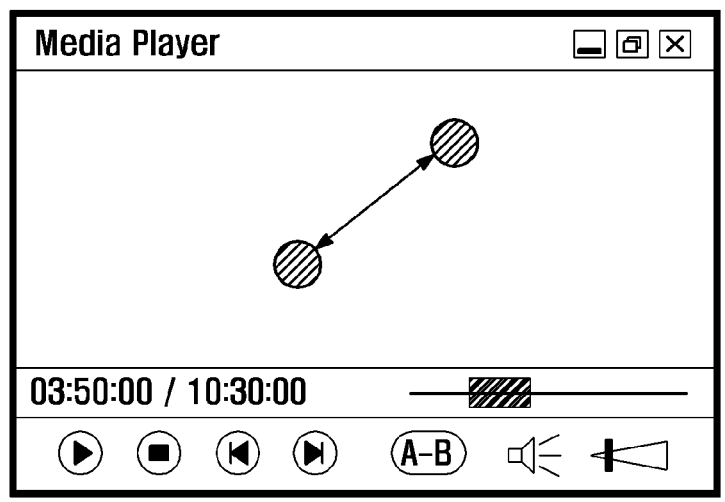

Next, the control unit 130 moves the playback position in proportion to the variation of the distance between the two coordinates (S315). For example, the distance between the coordinates of the two contact points shown in FIG. 7B may increase as shown in FIG. 7C. In this case, the control unit 130 moves an end time point of the repetitive playback section forward and moves a position indicator on the progress bar correspondingly.

Next, the control unit 130 determines whether the contact points on the touch screen 120 are released (S319). If the contact points on the touchscreen 120 are released, the control unit 130 sets the playback position just prior to release of the contact points as the end point of the repetitive playback section (S321) and repeats playback of the repetitive playback section defined by the start and end time points (S323). If the contact points on the touch screen 120 are not released, the control unit 130 repeats step S315. While setting the repetitive playback section, the control unit 130 may replay the repetitive playback section at a normal speed or at a speed consistent with the movement speed of playback time point.

As described above, the playback control method for a multimedia device according to exemplary embodiments of the present invention may enable a user to set a playback position and a repetitive playback section of a currently playing file with intuitive multi-touch behavior on a touchscreen.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A playback control method for a device having a touchscreen, the playback control method comprising:
initiating playback of a file from a first playback position;
receiving, while continuing the playback of the file, a multi-touch event on the touchscreen;
storing, while continuing the playback of the file, a second playback position based on receiving the multi-touch event; and
monitoring, while the multi-touch event is maintained, a distance between contact points of the multi-touch event while continuing the playback of the file,
wherein, in response to detecting a variation in the distance, the method further comprises:
changing, while continuing the playback of the file, the second playback position of the file in proportion to the variation in the distance; and
restarting, in response to detecting a release of the multi-touch event from the touchscreen, the playback of the file at the changed, second playback position, and
wherein, in response to detecting a release of the multi-touch event from the touchscreen without detecting a variation in the distance, the method further comprises:
restarting the playback of the file at the second playback position.

2. The playback control method of claim 1, further comprising:
moving a playback position indicator on a progress indication bar according to the variation of the distance.

3. The playback control method of claim 2, wherein moving a playback position indicator comprises:
moving the playback position indicator forward on the progress indication bar in proportion to an amount of increase in the variation of the distance.

4. The playback control method of claim 2, wherein moving a playback position indicator comprises:
moving the playback position indicator backward on the progress indication bar in proportion to an amount of decrease in the variation of the distance.

5. The playback control method of claim 2, further comprising:
moving a playback position indicator on a progress indication bar in a decreasing or increasing manner according to the variation in the distance.

6. The playback control method of claim 5, wherein moving the playback position indicator comprises:
increasingly moving, if the distance increases, the playback position indicator forward in proportion to a change in an amount of the distance; and
decreasingly moving, if the distance decreases, the playback position indicator backward in proportion to a change in an amount of the distance.

7. The playback control method of claim 1, wherein changing the second playback position comprises:
changing the second playback position forward in proportion to an amount of increase in the variation of the distance.

8. The playback control method of claim 1, wherein changing the second playback position comprises:
changing the second playback position backward in proportion to amount of decrease in the variation of the distance.

9. The playback control method of claim 1, further comprising:
displaying the changed, second playback position adjacent to a progress indication bar according to the movement from the second playback position.

10. The playback control method of claim 1, further comprising:
    displaying, on the touchscreen, a user interface to play the file, the user interface being divided into areas,
    wherein a first area of the areas comprises a progress indication bar, and
    wherein the multi-touch event is sensed in a second area of the areas, the second area being disposed outside the first area.

11. The playback control method of claim 1, wherein the multi-touch event is received directly on a presentation of the playback of the file.

12. An apparatus, comprising:
    at least one touch sensor configured to detect, while a file is playing, a multi-touch event on a touchscreen; and
    a control unit configured to:
        initiate playback of the file from a first playback position;
        receive, while continuing the playback of the file from the first playback position, an indication of the multi-touch event from the at least one touch sensor,
        store, while continuing the playback of the file from the first playback position, a second playback position based on reception of the indication of the multi-touch event,
        determine, while continuing the playback of the file from the first playback position, coordinates of and an initial distance between contact points of the multi-touch event, and
        monitor, while the multi-touch event is maintained, a distance between the contact points of the multi-touch event while continuing the playback of the file from the first playback position
    wherein, in response to a determination of a variation in the distance, the control unit is further configured to:
        change, in response to the determination of the variation in the distance, the second playback position of the file in proportion to the variation in the distance while continuing the playback of the file from the first playback position, and
        restart, in response to detection of a release of the multi-touch event from the touchscreen, the playback of the file at the changed, second playback position,
    wherein, in response to detection of a release of the multi-touch event from the touchscreen without a determination of a variation in the distance, the control unit is further configured to:
        restart the playback of the file at the second playback position, and
    wherein:
        the control unit is configured to, in response to a determination of an increase in the distance based on the initial distance, move the second playback position forward as the changed, second playback position, and
        the control unit is configured to, in response to a determination of a decrease in the distance based on the initial distance, move the second playback position backward as the changed, second playback position.

13. An apparatus, comprising:
    at least one touch sensor configured to detect multi-touch events in association with playback of a file; and
    a control unit configured to:
        initiate playback of the file from a first playback position,
        receive, while continuing the playback of the file from the first playback position, an indication of a multi-touch event from the at least one touch sensor,
        store, while continuing the playback of the file from the first playback position, a second playback position based on reception of the indication of the multi-touch event,
        monitor, while the multi-touch event is maintained, distance between contact points of the multi-touch event while continuing the playback of the file from the first playback position,
    wherein, in response to detection of a variation in the distance, the control unit is further configured to:
        change, while continuing the playback of the file from the first playback position, the second playback position of the file in proportion to the variation in the distance, and
        restart, in response to detection of a release of the multi-touch event, the playback of the file at the changed, second playback position, and
    wherein, in response to detection of a release of the multi-touch event without detection of a variation in the distance, the control unit is further configured to:
        restart the playback of the file at the second playback position.

* * * * *